April 5, 1932.  W. F. HAMILTON  1,852,206
DISK CULTIVATOR
Filed Sept. 19, 1928   4 Sheets-Sheet 1
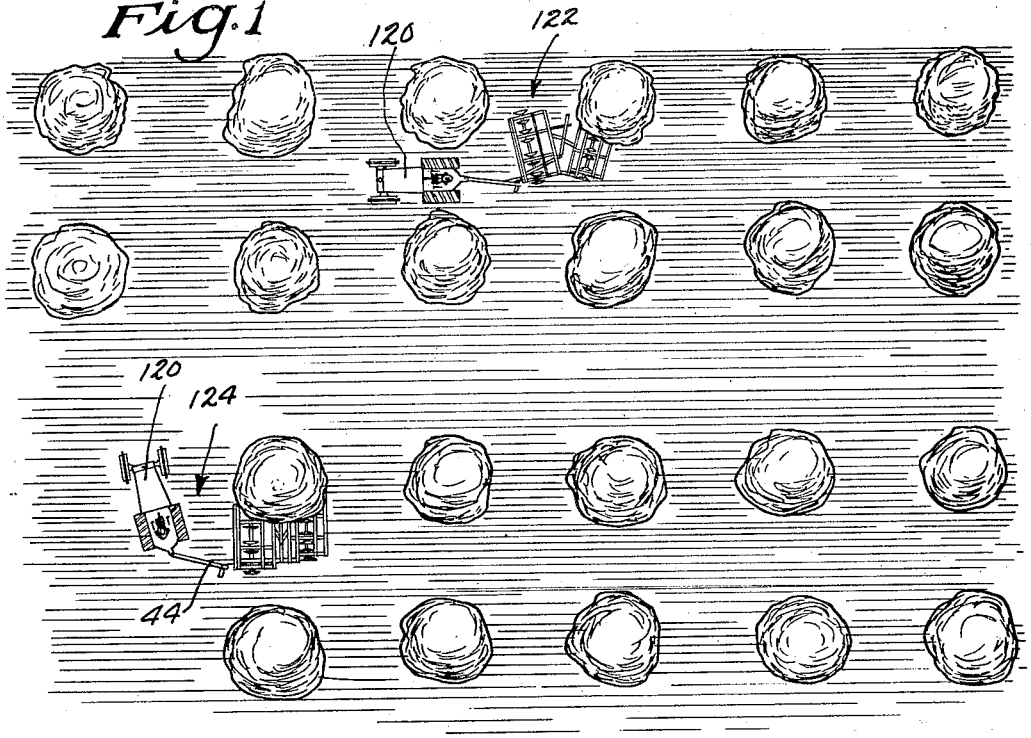
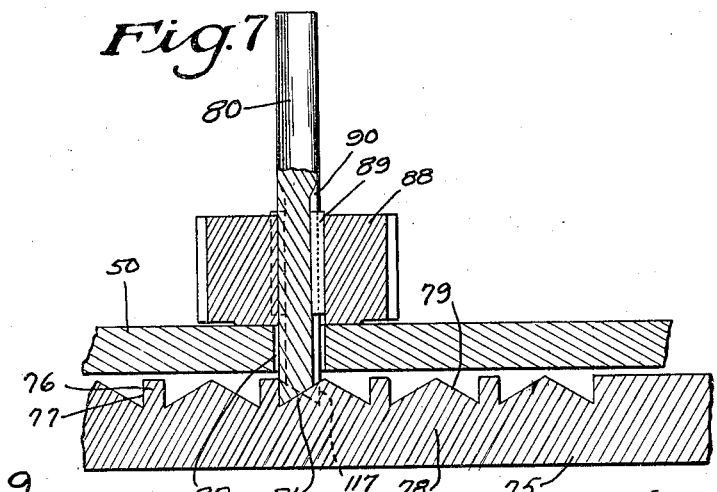
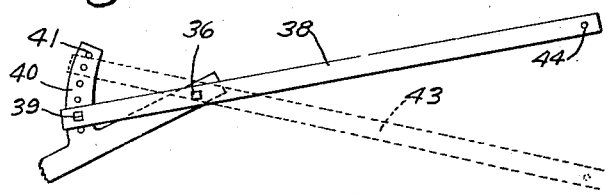
INVENTOR
William Francis Hamilton
ATTORNEY

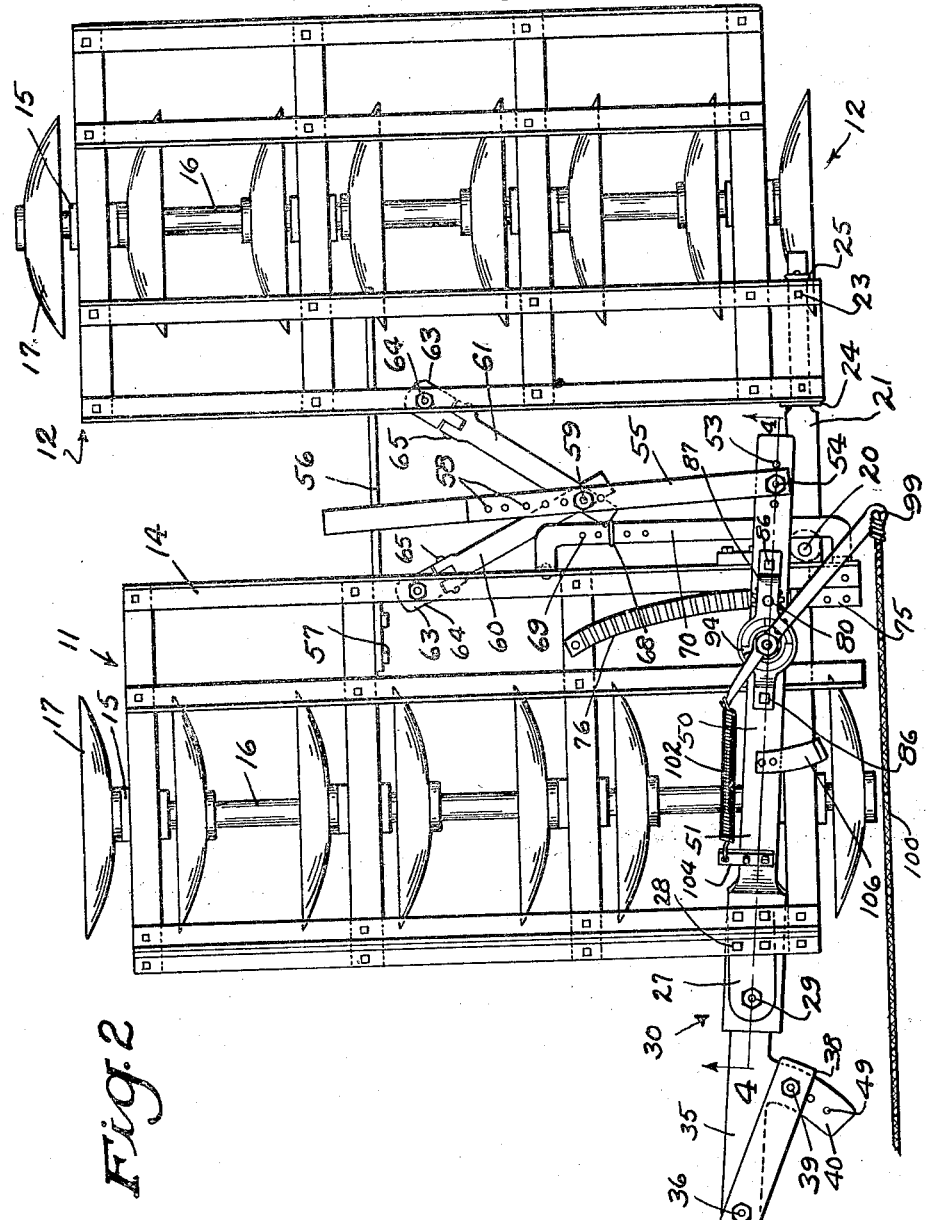

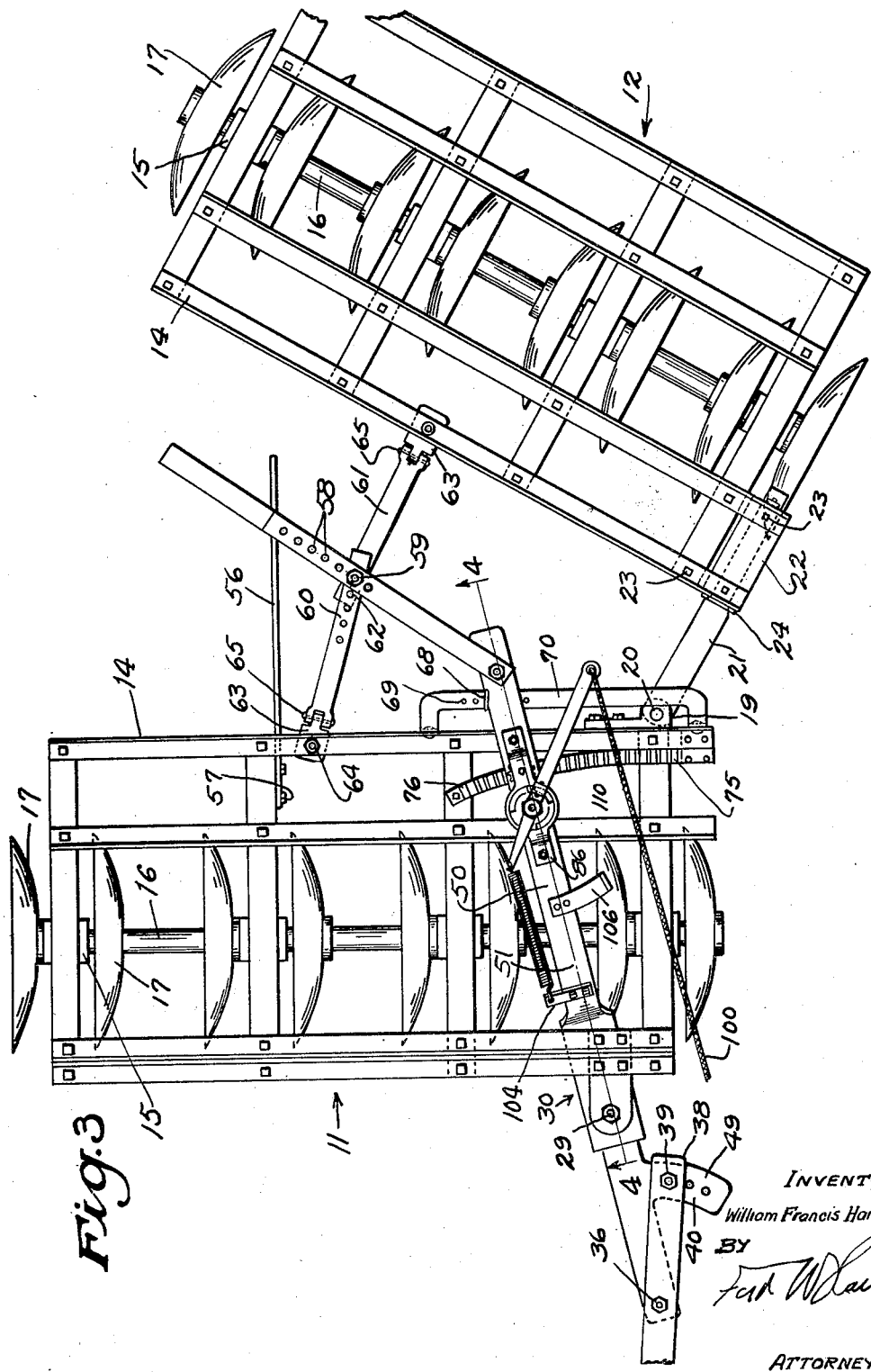

April 5, 1932. W. F. HAMILTON 1,852,206
DISK CULTIVATOR
Filed Sept. 19, 1928 4 Sheets-Sheet 4
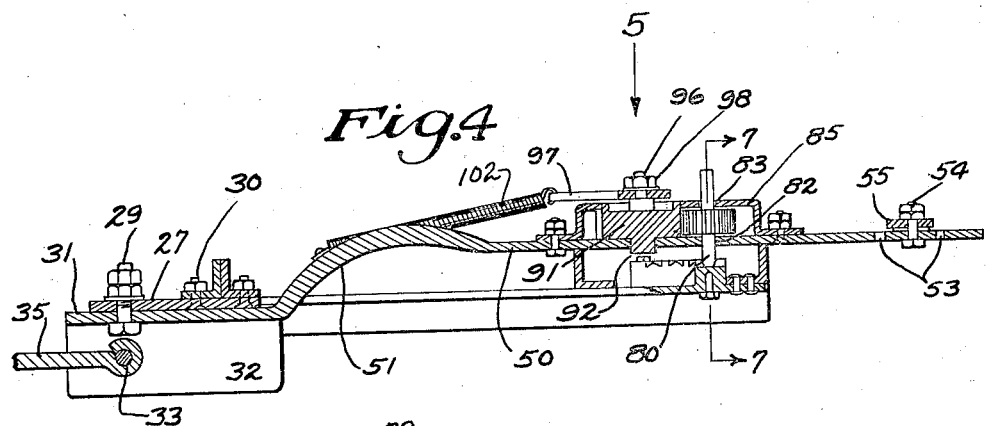
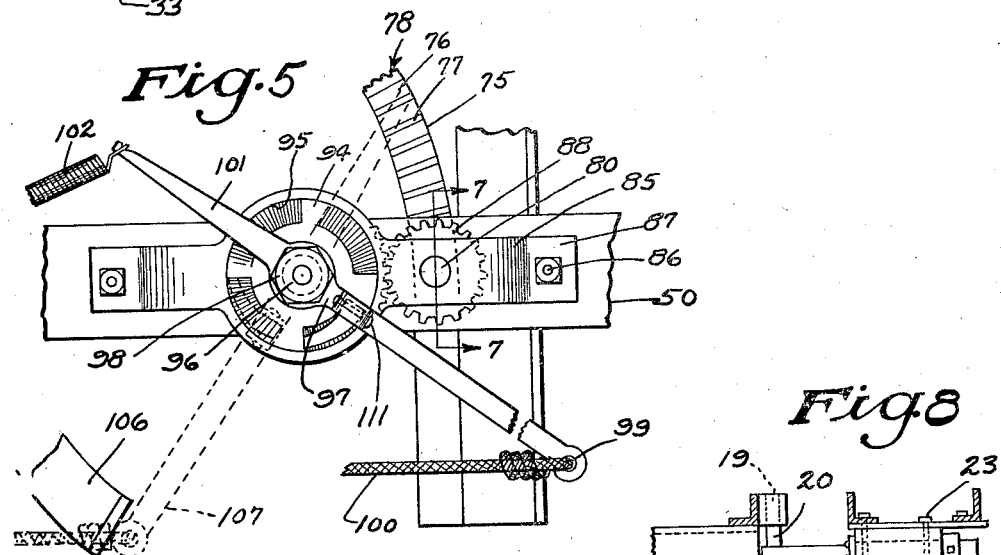
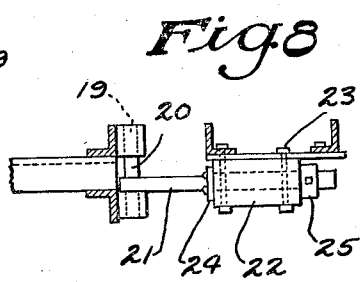
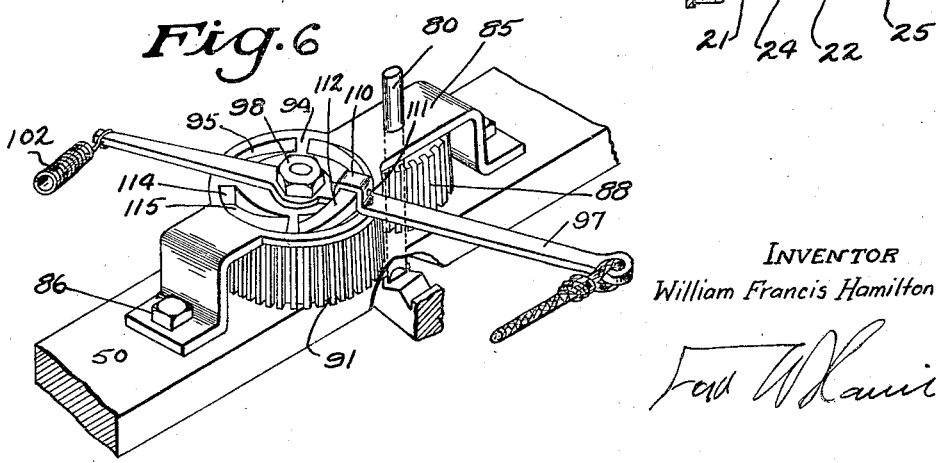
INVENTOR
William Francis Hamilton
ATTORNEY.

Patented Apr. 5, 1932

1,852,206

UNITED STATES PATENT OFFICE

WILLIAM FRANCIS HAMILTON, OF VENTURA, CALIFORNIA, ASSIGNOR TO VENTURA MANUFACTURING AND IMPLEMENT COMPANY, OF VENTURA, CALIFORNIA, A CORPORATION OF CALIFORNIA

DISK CULTIVATOR

Application filed September 19, 1928. Serial No. 306,802.

My invention relates to disk-cultivators used for turning soil in the agricultural industry. In its preferred embodiment my invention consists of a combination of novel features which will be pointed out in the statement of invention. Not only is my invention combinatively new in its entirety, but so far as I am informed, certain combinations of parts less than the whole are new.

In order that the objects and advantages of my invention may be understood, I shall briefly refer to the disk-cultivator art. The common form of disk-cultivator consists of a plurality of gangs, usually two, which are pivoted together. Each gang consists of a frame, a shaft rotatably supported on the frame, and cultivator-disks secured to the shaft. Connected to the front-gang is a draft-frame whereby the disk-cultivator may be pulled over the ground, and also provided on the disk-cultivator is suitable releasing-means whereby the parts may be permitted to move from working into non-working position, and vice versa.

I shall now point out the foremost objects of my invention.

One of the objects of the invention is to provide a disk-cultivator in which the gangs may be locked in working or non-working position.

Another object of the invention is to provide a disk-cultivator which may be turned in either direction without any of the cultivator-disks being embedded in the ground.

It is an additional object of the invention to provide a disk-cultivator in which the gangs will move from working position into non-working position when the disk-cultivator is turned in a direction toward the free sides of the gangs.

The advantage of this arrangement is that it is not necessary to back up the cultivator and lock the gangs in non-working position when it is desired to turn, as mentioned above. In the ordinary form of disk-cultivator this is necessary, or else certain of the disks will be embedded in the ground.

It is another object of the invention to provide a disk cultivator in which the front-gang and rear-gang are pivotally spread apart by means connected directly to the draft-frame of the disk-cultivator.

It is a further object of the invention to provide a disk cultivator in which the draft-frame has a latch-arm rigidly attached to it. The draft-frame is pivoted to the front-gang, and when the draft-frame moves on its pivot, the latch-arm causes the front-gang and rear-gang to pivotally spread.

It is a still further object to provide a disk cultivator in which the front-gang and rear-gang are pivotally spread by a toggle.

It is a still further object of the invention to provide a disk cultivator in which the latch-means for holding the cultivator in working or non-working position, is carried by the latch-arm.

It is a still further object of the invention to provide a disk-cultivator in which the draft-frame is adjustable so that the disk cultivator may be pulled directly in back of, or to one side of the tractive vehicle.

It is another of the invention to provide a disk cultivator in which the draft-frame has a single arm pivoted to one end of the front-gang, the tractive vehicle being connected to this single arm.

It is a further object of the invention to provide a disk cultivator in which the single arm of the draft-frame has an adjustable portion, which may be adjusted so that the disk cultivator may be pulled directly in back of, or to one side of the tractive vehicle.

The objects and advantages of the invention which I have just pointed out appear to me at the present time to be the most important of the invention. In the detailed description which is to follow, other objects and advantages will be discussed.

My invention may be best understood by reference to the accompanying drawings which illustrate the preferred form of my invention.

By referring to the drawings,

Fig. 1 is a diagrammatic view illustrating the utility of the invention.

Fig. 2 is a plan view of the invention, the parts being in non-working position.

Fig. 3 is a view similar to Fig. 2, showing the invention in working position.

Fig. 4 is a section of the latch-arm and latch-operating mechanism of the invention, this view being taken on the line 4—4 of Fig. 3.

Fig. 5 is a plan view of Fig. 4 taken as indicated by the arrow 5 of Fig. 4.

Fig. 6 is a perspective view of the latch-operating mechanism illustrated in Figs. 4 and 5.

Fig. 7 is an enlarged fragmentary section of the rack and latch-pin provided by the invention, this view being taken as indicated by the lines 7—7 of Figs. 4 and 5.

Fig. 8 is a fragmentary view showing the pivotal means which attach the front-gangs and rear-gangs together.

Fig. 9 is a fragmentary view showing the adjustable portion of the draft-frame of the invention.

Referring to the drawings in detail, the numeral 11 represents a front-gang, and the numeral 12 represents a rear-gang. The front-gang and rear-gang 11 and 12 respectively each includes a rectangular frame 14, which is formed of angle-irons secured together by suitable bolts or rivets. Carried by each frame 14 is a plurality of bearings 15 which are aligned and rotatably support a shaft 16. Secured on each shaft 16 is a plurality of cultivator-disks 17 which turn the soil when the disk cultivator is in working position and when it is being pulled along the ground. Any suitable form of gangs may be provided, and in the drawings I show what is considered a standard form of construction.

For pivotally attaching the front and rear gangs together I provide the following means. The rear left corner of the frame of the front-gang 11 carries a bracket 19 which supports a vertical pivot-pin 20. The vertical pivot-pin 20 extends through an opening formed in the forward end of a pivot-link 21. The rear end of the pivot-link 21 extends through a horizontal bearing 22 which is secured by suitable bolts 23 to the forward left hand corner of the frame 14 of the rear-gang 12. Relative axial movement of the pivot-link 21 and the bearing 22 is prevented by shoulders 24 and 25 formed on, or connected to, the pivot-link 21 as shown. The connection of the pivot-link 21 and the pivot-pin 20 permits a relative pivotal movement of the gangs 11 and 12 in a horizontal plane. The rotatableness of the pivot-link 91 and the bearing 22 permits a relative tilting movement of the gangs 11 and 12 in a vertical plane.

The forward left corner of the frame 14 of the front-gang 11 is provided with a pivot-plate 27 which is secured thereto by suitable bolts 28. The pivot-plate carries a vertical frame-pivot 29, by means of which the draft-frame 30 of the invention is pivotally connected with the front-gang 11. The frame-pivot 29 extends through a main portion 31 of the draft-frame. This main portion 31 has a downwardly extending flange 32 which carries a horizontal pivot 33. Pivoted on the horizontal pivot 33 is a hinged-member 35 of the draft-frame. As shown in Figs. 2, 3, 4, and 9 the hinge-member has a vertical pivot 36 carried at its forward end, on which adjustable-arm or adjustable-portion 38 of the draft-frame is pivoted. The rear end of the adjustable frame 38 is provided with an opening through which a bolt 39 may be extended. The hinged-member 35 is provided with arcuated plate 40 which extends outward to one side thereof, and which is provided with a plurality of openings 49. The bolt 39 is adapted to extend through one of the openings 49, and thus determines the position of the adjustable-arm 38 relative to the remaining parts of the draft-frame. As an illustration, the adjustable-arm 38 may be secured in the position shown by full lines in Fig. 9, or if desired may be secured in the position shown by dotted lines 43. The forward end of the adjustable arm 38 is provided with a hole 44, whereby it may be attached to a tractive-means for pulling the disk cultivator of the invention.

Rigidly connected to the portion 31, and extending rearwardly from the frame-pivot 39, is a latch-arm 50 of the invention. The latch-arm 50 has an offset portion 51 so that the rearward end thereof extends above the frame 14 of the front-gang 11, whereas the forward end thereof meets with the portion 31 of the draft-frame 30 which extends below the frame 14 of the front-gang 11. The rearward end of the latch-arm 50 is provided with a plurality of openings 53, one of which carries a pivot 54, by means of which one end of a link 55 is pivotally connected to the latch-arm 50.

The free end of the link 55 is supported by a horizontal supporting-bar 56, which is secured by bolts 57 to the frame 14 of the front-gang 11 shown in Figs. 2 and 3. The central part of the link 55 is provided with a plurality of openings 58, one of which carries a pivot 59. Also carried by the pivot 59 are the swinging ends of toggle-bars 60 and 61, these bars 60 and 61 having openings 62 formed therein, through which the pivot 59 is extended. The pivoted ends of the toggle-bars 60 and 61 are connected to the frames 14 of the front-gang 11 and the rear-gang 12 respectively by means of pivot-brackets 63 which are pivoted to the respective frames 14 by vertical pivots 64. The pivot-bars 63 are hinged by horizontal hinge-pins 65 to the toggle-bars 60 and 61. The hinge-pins 65 permit relative vertical hinging motion, or tilting motion of the front-gang and rear-gang without any damage to the toggle arrangement. The toggle-bars, which I have just described, constitute the means of the invention for pivotally spreading the front-gang 11 and rear-gang 12 on the gang-pivot 20, and the latch-arm and the parts associated therewith constitute a means for operating said gang-spreading toggle means.

The amount which the draft-frame and the latch-frame may swing on the frame-pivot 29 is governed by means of an adjustable stop 68 which is supported in openings 69 of a horizontal-bar 70. The horizontal-bar 70 is suitably secured to the rear left part of the frame 14 of the front-gang 11. It will be seen that by placing the adjustable stop 68 in a different hole 69, that the distance which the latch-arm is allowed to swing from the position shown in Fig. 2, may be varied.

Another provision of the invention is the latch-means whereby the disk cultivator may be locked in working or non-working position. Referring to Figs. 2 to 7 inclusive, an arcuated rack 75 is secured in a suitable manner to the rear left corner of the frame 14 of the front-gang 11. As illustrated best in Fig. 7, this rack 75 has a plurality of spaced teeth 76 which provide vertical opposing shoulders 77. Placed between the teeth 76 are inverted V-shaped ridges 78 which provide inclined surfaces 79. The inclined surfaces 79 terminate in points to form the ridges 78, these points being of substantially the same level as the upper ends of the teeth 76.

Adapted to operate in connection with the rack 75 is a vertical latch-pin 80, the lower end of which has a beveled-face 81. The latch-pin 80 extends through an opening 82 provided in the latch-arm 50 and through an opening 83 provided in a yoke 85. The yoke 85 is secured to the upper face of the latch-arm 50 by means of bolts 86 which extend through flanges 87 thereof.

The latch-pin 80 is free to move vertically by its own weight; consequently it may be guided by the contour of the rack 75 when the pin is moved in a direction which will cause the beveled face 81 to follow the upper exposed faces of the rack 75. Surrounding the latch-pin 80 between the latch-arm 50 and the yoke 85 is a latch-pin gear 88. The latch-pin gear 88 is connected to the latch-pin 80 by means of a key 89 which extends into a keyway 90 of the latch-pin 80. This form of connection permits the latch-pin 80 to move vertically relative to the latch-pin gear 88. Mounted between the latch-arm 50 and the yoke 85 in mesh with the latch-pin gear 88 is an operating gear 91. The operating gear 91 has a lower trunnion 92 which journals in an opening formed in the latch-arm 50. The upper part of the operating gear 91 is provided with a cylindrical formation 94 which extends into a bearing opening 95 formed in the yoke 85. Extending upward from the operating gear 91 is a stud 96 on which an operating lever 97 is pivoted. The operating lever is prevented from being moved from the stud 96 by means of a nut 98. The operating lever 97 has an eye 99 at its outer end so that an operating member in the form of a flexible member 100 may be connected thereto. The flexible member 100 is adapted to extend forwardly to the tractive vehicle, where it may be pulled upon to operate the latch-means of the invention. The operating lever 97 has an arm 101 to which a return spring 102 is connected. The return spring 102 at its other end is connected by a bracket 104 to the latch-arm 50. Also carried by the latch-arm 50 is a stop 106 which determines the actuated position of the lever 97, which position is indicated by broken lines 107 in Fig. 5. The latch-arm 50 as shown best in Fig. 6 is provided with an upwardly bent portion 110, which carries a pivot 111 on which a pawl 112 is pivoted.

Formed in the cylindrical formation 94 of the operating gear 91 are a plurality of vertical shoulders 114 which connect to the lower ends of the inclined faces 115. The pawl 112 is adapted to engage one of the shoulders 114 so that when the operating lever 97 is operated, the operating gear 91 is rotated. The rotation of the operating gear 91 causes the latch-pin gear 88 to rotate, and consequently the latch-pin 80 is rotated. The stop 106 for the operating lever 97 is in such a position that upon one actuation thereof the latch-pin 80 will be revolved one-half a revolution. In other words, the latch-pin 80 will be revolved from the position shown in full lines in Fig. 7, into a position shown by dotted lines 117 in Fig. 7.

The operation of my invention is as follows:

In Fig. 2 the disk cultivator is shown in non-working position. When the gangs are in the position shown in this view, the cultivator-disks 17 rotate on an axle at right angles to the direction of movement, and do not till the soil. It will be noted that at this time the latch-arm 50 is in such a position that the link 55 holds the toggle-bars 60 and 61 in collapsed position. The latch-pin 80 at this time is held in such a position that it engages one of the teeth 76 of the rack 75, and prevents the latch-arm from swinging toward the right side of the disk cultivator.

When it is desired to cultivate the soil, the operator pulls on the flexible-member 100 so as to swing the operating lever 97 into position against the stop 106, as indicated by dotted lines 107. The pawl 112, due to its engagement with one of the shoulders 114 of the rotating-gear 91, rotates the operating-gear 91. The operating-gear 91 in turn rotates the latch-pin gear 88 one-half a revolution so that the latch-pin 80 is moved one-half a revolution from the position shown in the full lines 107 into the position shown by dotted lines in Fig. 7. When the latch-pin is in this position the beveled face 81 is toward the right side of the disk cultivator, and will permit the latch-arm 50 to swing from the position shown in Fig. 2 into the position shown in Fig. 1. When this occurs the link 55 moves toward the right and allows the toggle-members 60 and 61 to move from collapsed position, as shown in Fig. 2, into extended position as shown in Fig. 3. This causes the front-gang and rear-gang to be pivotally spread. The positions of the parts are controlled by the adjustable stop 68, which may be positioned in any one of the openings 69 of the bar 70.

Thus it will be understood that when the implement is being drawn along locked in non-working position and it is desired that it assume a working position, it is only necessary that the operator pull on the flexible member 100 to give a half-turn to the latch-pin 80 to release the latch-arm 50, so that it may swing to the right and spread the toggle members 60—61 to spread the gangs. This operation may be effected without turning the tractor, the apparent swing to the right of the latch-arm 50 and the resultant spreading of the gangs being due to the drag of the disks in the soil and the tendency of the load to center itself directly in line of draft.

When the gangs are in the positions illustrated in Fig. 3, the cultivator-disks 17 rotate in planes which are at angles to the direction of movement of the disk cultivator, and therefore have a tilling action on the soil. When the latch-arm 50 has moved into the position indicated in Fig. 3, it cannot move further to the right, because of the adjustable stop 68. It cannot move to the left because the latch-pin 80 will engage one of the teeth 76 and prevent a leftward movement. The parts therefore are locked in the positions shown in Fig. 3 until the operating-lever 97 is again actuated as explained heretofore to return the latch-pin into position as indicated by full lines in Fig. 7.

Now, assuming that the implement is being drawn along locked in this working position and it is desired that it assume a non-working position, it becomes necessary to pull the flexible-member 100 to give a half-turn to the latch-pin 80, thus releasing the latch-arm 50 so that it may swing to the left to normalize the gangs. However, to effect this swing to the left of the latch-arm 50, it is necessary that the tractor be manipulated so as to exert a pull to the right on the forward end of the draft-arm 38 until the latch-arm 50 is swung to normal and latched, after which the tractor may again assume its straight travel.

It should be evident that with the gangs in non-working position as shown in Fig. 2, a left turn of the tractor will pull the forward end of the draft-arm 38 to the left, and with the latch mechanism positioned to permit the rear end of the latch-arm 50 to swing inwardly, it will do so to spread the gangs to the position shown in Fig. 3, and in rounding the turn the disks of both gangs will more or less track freely through the soil. It will be understood that the ideal free tracking of the disks in making such a left turn will occur when the center of such turn is at the point of intersection of two axial lines drawn through the axles of the respective gangs of disks. Now when after making this left turn, a straight course is resumed it is obvious that the latch-arm 50, with the latch-pin 80 reversed, will swing back again to the position shown in Fig. 2 and thus restore the gangs to non-working position.

Now, considering the gangs in a working position as shown in Fig. 3 and as shown at 122 in Fig. 1, it will be evident that if the tractor is turned to the right to make a turn, the forward end of the draft-arm 38 will be pulled to the right and, with the latch-pin 80 properly set, will swing the rear end of the latch-arm 50 outwardly to collapse the toggle connection and restore the gangs to non-working position so as to permit such right-hand turn, it being obvious that with the gangs spread apart it would be exceedingly difficult to make this right-hand turn. Obviously in again resuming a straight course after making said right turn, the latch-arm 50 will swing back again to restore the gangs to their working positions.

Of course in turning to the right with the gangs already in non-working position, as illustrated at 124 in Fig. 1, no operation of the latch-arm 50 is effected and the gangs remain in their non-working positions. Likewise in making a left turn with the gang already in working positions no operation of the latch-arm 50 is effected, the gangs in this case remaining in their working positions. This explains the different turning operations and points out those in which the latch-arm 50 is swung by the tractor to shift the gangs, it being noted that whenever the implement makes a left turn the gangs are shifted to working positions or if already in working positions are maintained in working positions, and that whenever the implement makes a right turn the gangs are shifted to non-working positions or if already in non-working positions are maintained in non-working positions. Of course it is obvious that if the gangs were connected together on the right side and the draft frame and associated mechanism were on the right side instead of on the left side as illustrated, these operations would be reversed, the terms right and left turns as used herein being relative to the free sides of the gangs.

It is often necessary to pull the disk cultivator in an offset position in back of the tractive vehicle so that the soil under trees may be cultivated. As shown in Fig. 1, the tractive vehicle 120 must travel in the path provided between rows of trees 121. If the soil below the trees is to be cultivated, the cultivator must be offset as shown at 122 in Fig. 1.

In my invention the disk cultivator may be pulled in back, or to one side, of the tractive vehicle 120, depending upon the adjustment of the adjustable-arm 38. As shown in Fig. 9, when the adjustable-arm is in full line position, the disk cultivator will be pulled in back of, and at the right side of, the tractive vehicle 120. When it is desired to pull the disk cultivator in back of the tractive vehicle, the adjustable-arm 38 may be swung into dotted line position 43. When it is desired to make a right hand turn, as indicated at 124 in Fig. 1, it is necessary to operate the operating lever 97 in order to rotate the latch-pin into the position shown by full lines in Fig. 7, so that the latch-arm 50 may swing to the left. When this is accomplished the tractive vehicle may be turned to the right without causing any damage to the disk cultivator, as would occur in the ordinary disk cultivator if it were attempted to make a turn without first moving the gangs into non-working position.

It is possible for my invention to make a right hand turn in view of the fact that the parts are so designed that during the rounding of the turn the gangs automatically move into non-working position. In previous types of disk cultivators, of which I have knowledge, if a right hand turn is to be made it is necessary for the operator to back up the tractor and set the parts in non-working position in this manner. In my invention the parts automatically move into non-working position during the making of the turn, and does not require the tractive vehicle to be backed.

I claim as my invention:

1. In a disk cultivator, the combination of: a front-gang; a rear-gang; a gang-pivot for connecting said gangs together; gang-spreading means for pivotally spreading said front-gang and rear-gang; a draft-frame; a draft-frame pivot whereby said draft-frame is pivotally connected to said front-gang; and an arm carried by and movable with said draft-frame, said arm extending rearward from said draft-frame pivot and being operatively connected to said gang-spreading means for operation thereof on pivotal movement of the draft-frame and arm relative to the front-gang.

2. In a disk cultivator, the combination of: a front-gang; a rear-gang; a gang-pivot for connecting said gangs together; gang-spreading means including a toggle for pivotally spreading said front-gang and rear-gang; a draft-frame; a draft-frame pivot whereby said draft-frame is pivotally connected to said front-gang; and an arm carried by and movable with said draft-frame, said arm extending rearward from said draft-frame pivot, and being operatively connected to said gang-spreading means for operation thereof on pivotal movement of the draft-frame and arm relative to the front-gang.

3. In a disk cultivator, the combination of: a front-gang; a rear-gang; a gang-pivot for connecting said gangs together; a gang-spreading means for pivotally spreading said front-gang and rear-gang; a draft-frame connected to said front-gang for operation thereof on movement of the draft-frame relative to the front-gang; a latch-arm rigidly connected to said draft-frame so as to move therewith, said latch-arm being operatively connected to said gang-spreading means for operation thereof on movement of said draft-frame and latch-arm relative to said front-gang; a rack carried by said front-gang; a rack-engaging pin carried by said latch-arm; and latch-operating means for operating said rack-engaging pin to permit a movement of said latch-arm relative to said front-gang.

4. In a disk cultivator, the combination of: a front-gang; a rear-gang; a gang-pivot for connecting said gangs together; gang-spreading means for pivotally spreading said front-gang and rear-gang; a draft-frame; a draft-frame pivot whereby said draft-frame is pivotally connected to said front-gang; a latch-arm rigidly connected to said draft-frame so as to move therewith, said latch-arm being operatively connected to said gang-spreading means for operation thereof on pivotal movement of said draft-frame and latch-arm relative to said front-gang; a rack carried by said front-gang; a rack-engaging pin carried by said latch-arm; and latch-operating means for operating said rack-engaging pin to permit a movement of said latch-arm relative to said front-gang.

5. In a disk cultivator, the combination of: a front-gang; a rear-gang; a gang-pivot for connecting said gangs together; gang-spreading means for pivotally spreading said front-gang and rear-gang; a draft-frame; a draft-frame pivot whereby said draft-frame is pivotally connected to said front-gang; a latch-arm rigidly connected to said draft-frame so as to move therewith, said latch-arm extending rearward from said draft-frame pivot and being operatively connected to said gang-spreading means for operation thereof on pivotal movement of said draft-frame and latch-arm relative to said front-gang; a rack carried by said front-gang; a rack-engaging pin carried by said latch-arm; and latch-operating means for operating said rack-engaging pin to permit a movement of said latch-arm relative to said front-gang.

6. In combination in a disk cultivator: a movable latch-arm; a rack having a plurality of teeth; a latch-pin carried by said latch-arm and adapted to engage one of said teeth for preventing relative movement of said rack and said latch-arm in one direction; and latch-operating means for operating said latch-pin for preventing a relative movement of said rack and said latch-arm in another direction.

7. In combination in a disk cultivator: a movable latch-arm; a rack having a plurality of teeth; a latch-pin carried by said latch-arm and adapted to engage one of said teeth for preventing relative movement of said rack and said latch-arm in one direction; and latch-operating means for operating said latch-pin for preventing a relative movement of said rack and said latch-arm in another direction, said latch-operating means including a pair of gears for rotating said latch-pin.

8. In combination in a disk cultivator: a movable latch-arm; a rack having a plurality of teeth; a latch-pin carried by said latch-arm and adapted to engage one of said teeth for preventing relative movement of said rack and said latch-arm in one direction; and latch-operating means for operating said latch-pin for preventing a relative movement of said rack and said latch-arm in another direction, said latch-operating means including a pair of gears for rotating said latch-pin, and lever and pawl means for rotating one of said gears.

9. In a ground-working implement, the combination of: a front-gang; a rear-gang connected to said front-gang; a draft-frame adapted for connection to a tractive means and connected only to one side of said front-gang so that the entire pull of said tractive means will be exerted on said one side of the front-gang, said draft-frame including a main portion pivoted to said one side of the front-gang so as to swing laterally relative to said front gang and a forwardly projecting draft-arm carried by said main portion, the free end of said draft-arm being adapted for attachment to said tractive means; and means intermediate the draft-frame and the front-gang controlling the draft-frame relative to the front-gang.

10. In a ground-working implement, the combination of: a front-gang; a rear-gang connected to said front-gang; a draft-frame adapted for connection to a tractive means and connected only to one side of said front-gang so that the entire pull of said tractive means will be exerted on said one side of the front-gang, said draft-frame including a main portion pivoted to said one side of the front-gang so as to swing laterally relative to said front-gang and a forwardly projecting draft-arm pivotally mounted on said main portion so as to swing horizontally, the free end of said draft-arm being adapted for attachment to said tractive means, and securing-means for securing said draft-arm in various positions of adjustment; and means intermediate the draft-frame and the front-gang controlling the draft-frame relative to the front-gang.

11. In a ground-working implement, the combination of: a front-gang; a rear-gang connected to said front-gang; a draft-frame adapted for connection to a tractive means and connected only to one side of said front-gang so that the entire pull of said tractive means will be exerted on said one side of the front-gang, said draft-frame including a main portion pivoted to said one side of the front-gang so as to swing laterally relative to said front-gang, a member hinged to said main portion to swing vertically, and a forwardly projecting draft-arm carried by said hinged member, the free end of said draft-arm being adapted for attachment to said tractive means; and means intermediate the draft-frame and the front-gang controlling the draft-frame relative to the front-gang.

12. In a ground-working implement, the combination of: a front-gang; a rear-gang connected to said front-gang; and a draft-frame adapted for connection to a tractive means and connected only to one side of said front-gang so that the entire pull of said tractive means will be exerted on said one side of the front-gang, said draft-frame including a main portion pivoted to said one side of the front-gang, a member hinged to said main portion to swing vertically, a forwardly projecting draft-arm pivoted to said hinged member to swing horizontally, and securing-means for securing said draft-arm in various positions of adjustment.

13. In a ground-working implement, the combination of: a front-gang; a rear-gang connected to said front-gang; a draft-frame adapted for connection to a tractive means and connected only to one side of said front-gang so that the entire pull of said tractive means will be exerted on said one side of the front-gang, said draft-frame being pivoted to said one side of said front-gang so as to swing laterally relative to said front-gang and having a forwardly projecting draft-arm, the free end of said draft-arm being adapted for attachment to said tractive means; and adjustable means provided to release said draft-arm to swing laterally.

14. In a ground-working implement, the combination of: a front-gang; a rear-gang pivotally connected to said front-gang; a draft-frame adapted for connection to a tractive means and pivotally connected to one side of said front-gang so that the entire pull of said tractive means will be exerted on said one side of said front-gang, said draft-frame including a forwardly projecting draft-arm adapted for attachment to said tractive means; and latch-means associated with said draft-frame and adapted to permit the lateral swinging of said draft-frame when said implement is turned.

15. In a ground-working implement, the combination of: a front-gang; a rear-gang connected to said front-gang; a draft-frame connected only to one side of said front-gang so that the entire pull of said tractive means will be exerted on said one side of the front gang, said draft-frame including a main portion pivoted to said one side of said front-gang so as to swing laterally relative to said front-gang, a member hinged to said main portion to swing vertically, and a forwardly projecting draft-arm carried by said hinged member, the free end of said draft-arm being adapted for attachment to said tractive means; and means provided to permit the lateral swinging of said draft-arm when said implement is turned.

In testimony whereof, I have hereunto set my hand at Ventura, California, this 11th day of September, 1928.

WILLIAM FRANCIS HAMILTON.